(12) United States Patent
Aufenast

(10) Patent No.: US 11,932,440 B2
(45) Date of Patent: Mar. 19, 2024

(54) THERMOFORMING PACKAGING MACHINE

(71) Applicant: WHAT THE FUTURE VENTURE CAPITAL (WTFVC) B.V., Amsterdam (NL)

(72) Inventor: Edmund David Aufenast, Amsterdam (NL)

(73) Assignee: What The Future Venture Capital (WTFVC) B.V., Amsterdam (NL)

( * ) Notice: Subject to any disclaimer, the term of this patent is extended or adjusted under 35 U.S.C. 154(b) by 366 days.

(21) Appl. No.: 17/417,880

(22) PCT Filed: Jan. 9, 2020

(86) PCT No.: PCT/EP2020/050369
§ 371 (c)(1),
(2) Date: Jun. 24, 2021

(87) PCT Pub. No.: WO2020/144252
PCT Pub. Date: Jul. 16, 2020

(65) Prior Publication Data
US 2022/0073223 A1 Mar. 10, 2022

(30) Foreign Application Priority Data
Jan. 10, 2019 (NL) ........................................ 2022370

(51) Int. Cl.
*B65B 9/04* (2006.01)
*B29C 51/18* (2006.01)
(Continued)

(52) U.S. Cl.
CPC .............. *B65B 9/045* (2013.01); *B29C 51/18* (2013.01); *B33Y 80/00* (2014.12); *B65B 59/04* (2013.01)

(58) Field of Classification Search
CPC ............ B29C 66/81427; B29C 66/849; B29C 66/53461; B29C 66/8167; B29C 66/8322;
(Continued)

(56) References Cited

U.S. PATENT DOCUMENTS

| 4,263,767 A * | 4/1981 | Kyle | .................. B65B 31/021 53/511 |
|---|---|---|---|
| 7,718,026 B2 | 5/2010 | Alexander | |
| 2013/0255201 A1 | 10/2013 | Holzem et al. | |

FOREIGN PATENT DOCUMENTS

| EP | 1340678 A1 | 9/2003 |
|---|---|---|
| EP | 2769923 A1 | 8/2014 |

(Continued)

OTHER PUBLICATIONS

International Search Report and Written Opinion for PCT/EP2020/050369; dated May 8, 2020; 12 pgs.

*Primary Examiner* — Thomas M Wittenschlaeger
(74) *Attorney, Agent, or Firm* — Perilla Knox & Hildebrandt LLP

(57) ABSTRACT

The invention is directed to a thermoforming packaging machine (1) for producing sealed packages (2) having a planar surface (3) and a shaped recess (4) comprising a sealing station (6) with a lower sealing tool (7) comprising of a first part (8) provided with a first seal seam support (8*a*) for supporting a first sealed seam (9) at the outer perimeter (10) of the planar surface (3) of the moulded product (2*a*) and a second part (11) provided with a second support (11*a*) provided with a seal seam support opening (12). The second support (11*a*) supports a second sealed seam (12*a*) on the planar surface (3) of the moulded product (2*a*) following the perimeter (13) of the shaped recess (4). The first part (8) and the second part (11) are separate parts which are detachable connected.

10 Claims, 4 Drawing Sheets

Figure 1:
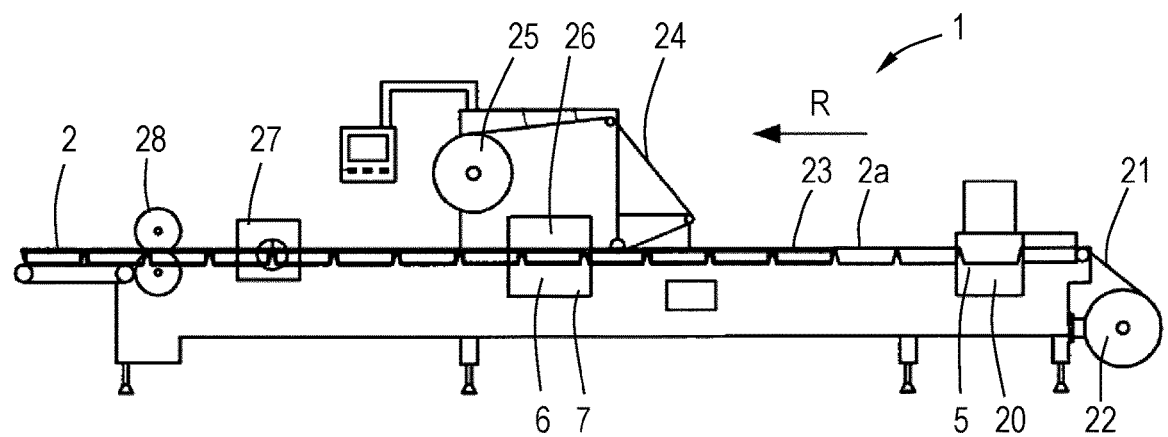

(51) Int. Cl.
*B33Y 80/00* (2015.01)
*B65B 59/04* (2006.01)

(58) Field of Classification Search
CPC ... B29C 66/841; B29C 66/112; B29C 66/131; B29C 66/8432; B29C 66/81457; B29C 66/242; B29C 66/24244; B29C 66/8122; B29C 65/18; B29C 65/76; B29C 65/7891; B29C 51/18; B29C 2793/009; B65B 59/003; B65B 59/04; B65B 51/14; B65B 9/045; B33Y 80/00; B29K 2883/00
See application file for complete search history.

(56) References Cited

FOREIGN PATENT DOCUMENTS

| WO | 2017125488 A1 | 7/2017 |
| WO | 2018220574 A1 | 12/2018 |

* cited by examiner

THERMOFORMING PACKAGING MACHINE

The invention is directed to a thermoforming packaging machine for producing sealed packages having a planar surface and a shaped recess.

Such packaging machines including a forming station and a sealing station are known. In the forming station a moulded product is formed by thermoforming using a shaped mould. In the sealing station a planar plastic film is fixed to an upper planar side of the shaped mould. The sealing station will have a lower sealing tool provided with a seal seam support. When an upper sealing tool is lowered upon the lower sealing tool supporting the moulded product and the plastic cover sheet a seam will form at the area supported by the seal seam support. Such a seam is typically locally formed by thermal fusion of the plastic sheet and the moulded product in the presence of an adhesive.

WO2017/125488 describes the manufacture of ice-lollypops as present in a moulded container and covered by a planar plastic sheet. The lollypop and stick are present in an indentation of the moulded container. The sealing station has an upper sealing tool provided with a raised ridge in a shape following the indentation of the moulded container. When sandwiching the moulded container and cover sheet between the upper and lower sealing tool a plastic weld is formed following the periphery of the indentation. According to the description the upper sealing tool may be manufactured by additive manufacturing. By manufacturing both the mould of the forming station and the upper sealing tool by means of additive manufacturing one is able to manufacture differently shaped products without having to invest in complex metal moulds as made by subtractive manufacturing for both the forming and sealing stations.

The present invention is directed to an improved thermoforming packaging machine which can seal thermoformed moulded products having differently shaped indentations or recess in an efficient manner.

This object is achieved by the following thermoforming packaging machine. A thermoforming packaging machine for producing sealed packages having a planar surface and a shaped recess comprising a forming station with a shaped mould suited to form a moulded product having the planar surface and the shaped recess, and a sealing station with a lower sealing tool, the lower sealing tool comprising of a first part provided with a first seal seam support for supporting a first sealed seam at the outer perimeter of the planar surface of the moulded product and a second part provided with a second seal seam support provided with a seal seam support opening to receive the shaped recess of the moulded product and wherein the second seal seam support supports a first sealed seam on the planar surface of the moulded product following the perimeter of the shaped recess and wherein the first part and the second part are separate parts which are detachable connected.

The advantage of the packaging machine is that a sealed package may be manufactured which has two seams or seals. Namely one which follows the outer perimeter of the planar surface and one which follows the perimeter of the shaped recess.

In this applications terms as lower, upper, below or above are used to describe the packaging machine in its most used orientation. These terms do not in any way limit the invention to a packaging machine in this orientation. For example the lower sealing tool may also be oriented vertically to seal a vertical oriented cover sheet to the moulded product.

The sealing station may be used to connect a cover sheet to the moulded product. To the moulded product a food, like a lollypop as in WO2017/125488, may be added before sealing the moulded product. Instead of a food product the moulded product may also be filled with other substances, preferably liquid substances. The cover sheet is suitably connected to the planar upper surface of the moulded product by means of so-called plastics welding. Plastic welding involves the that the cover sheet and the moulded product form a connection in the presence of an adhesive under the influence of heat at the location wherein the seal seam supports are pressed onto the moulded product from below such that at that location the combined cover sheet and moulded product are pressed to a heated plate positioned above the lower sealing tool. The aforementioned connection is referred to as a seam in this description.

Suitable cover sheets maybe those known for packaging food in thermoformed packages. Suitable cover sheets offer sufficient resistance to the entry of oxygen inside the sealed package to preserve the quality and flavour of the product contained until the use-by date indicated on the package. Examples of suitable cover sheets are preferably provided with an adhesive layer to achieve the sealed seam upon heating. Examples are preferably plastic films, e.g. one made from polyester, especially biaxially-orientated polyester such as the one sold under the registered trademark BIAXER (Wipak, Poland) or a PE/EVOH/PE three-layer lamination film or the TER HB50 AF EZ PEEL produced by BEMIS.

The first and/or second seal seam support may be a ridge as present on the upper surface of the first respectively second part. Preferably first and/or second seal seam support comprises of a gasket as present in a groove as present in the upper surface of the first respectively second part. The groove of the second seal seam support runs along the perimeter of the seal seam support opening. The gasket may be made of any material which can withstand the elevated sealing temperatures of for example 100° C. and above. Preferably the material is compressible, more preferably a rubbery type of material. Examples of suitable materials are silicone-rubbers. The use of a compressible gasket results in a more even pressure of the seal seam support onto the combined moulded product and cover sheet. The gasket suitably presses these two layers onto a heated plate positioned above to create the sealed areas. The heated plate is part of the sealing station.

The first part and the second part are separate parts which are detachable connected. This is advantageous when manufacturing differently shaped sealed packages wherein the shaped recess is different while the shape of the first sealed seam remains the same. By using separate parts it is possible to combine differently shaped second parts with the same first part. The first part may then suitably made of a metal for example by casting or subtractive manufacturing.

The second part is suitably manufactured by additive manufacturing allowing a simple manufacturing for the differently shaped second parts. Additive manufacturing, also referred to as 3D printing, enables one to manufacture and seal different shaped packages without having to machine a different sealing tool for a differently shaped package. A number of 3-D printing technologies will be available to the skilled addressee, printing in a range of materials including plaster, thermoplastics, photopolymerised polymers, or thermally-sintered materials. Specific examples of suitable materials and additive manufacturing techniques are ABS Plastic manufactured using Fused Deposition Modelling FDM, Selectively Laser Sintered SLS Nylon and Selectively Laser Sintered SLS Alumide®.

The first part and the second part may be detachably connected to an upper end of a lower sealing tool box. Alternatively the first part is a lower sealing tool box to which the second part is detachably connected.

Preferably more than one moulded products are sealed simultaneously in the sealing station. These moulded products are in turn suitably simultaneously made in the forming station. These moulded products are made starting from a single sheet and will typically be connected to each other as they leave the forming station and when they are sealed in the sealing station. In order to simultaneously seal these numerous moulded products it is preferred that the first part can support a first sealed seam at the outer perimeter of the planar surface of more than one moulded product and wherein more than one second parts are, preferably detachably, connected to the first part. Suitably the first part is provided with more than one openings for positioning the more than one second parts. The combined first and second parts may be bolted to a support as present in the lower sealing tool box thereby fixing the first and second parts to the lower sealing tool box.

The numerous sealed packages may be separated from each other in a cutting station. Preferably the sealed products are separated by cutting in the area between the first sealed seams of the different products.

Preferably the shaped mould of the forming station is manufactured by additive manufacturing. This allows the manufacture of differently shaped sealed using differently shaped moulds in the forming station and differently shaped second parts in the sealing station and using the same first part. For example a small series of sealed packages may be made especially designed for an event by simply manufacturing the shaped moulds and second parts using additive manufacturing and using the packaging machine according to the invention.

The invention is also directed to a packaging machine as described above except that it does not have a first part provided with a first seal seam support for supporting a first sealed seam at the outer perimeter of the planar surface of the moulded product. Such a packaging machine may be provided with a cutting station which cuts away the sealed product just at the exterior of the first sealed seam. Such a cutting station is suitably provided with a cutting knife having the shape corresponding with the shape of the first sealed seam. Preferably a row of knives is present in a groove present on a surface of a knife support. The groove may for example be made using CDC or additive manufacturing in a plastic or metal knife support.

The invention will be illustrated making use of the following FIGS. 1-7.

FIG. 1 shows a thermoforming packaging machine (1) according to the present invention for producing sealed packages (2). The machine is provided with a forming station (5) with a shaped mould (20) suited to form a moulded product (2a) from a plastic sheet (21) as fed from roll (22). Moulded product (2a) moves in direction of Arrow (R) towards a filling station (23). On top of the filled moulded product (2a) a cover sheet (24) is placed as fed from roll (25). In sealing station (6) the cover sheet (24) is sealed to the upper side of moulded product (2a) by sandwiching the moulded product (2a) and sheet (24) between lower sealing tool (7) and a hot plate (26). The sealed moulded products (2a) may be connected to neighbouring sealed moulded products (2a). In cutting station (27) the sealed moulded products (2a) may be separated from neighbouring products in the (R) direction. In cutting station (28) the sealed moulded products (2a) may be separated from neighbouring products (2a) in the perpendicular direction relative to (R). FIG. 8 shows the lower sealing tool for simultaneously sealing four moulded products (2a) in the perpendicular direction relative to (R).

Figure 2:
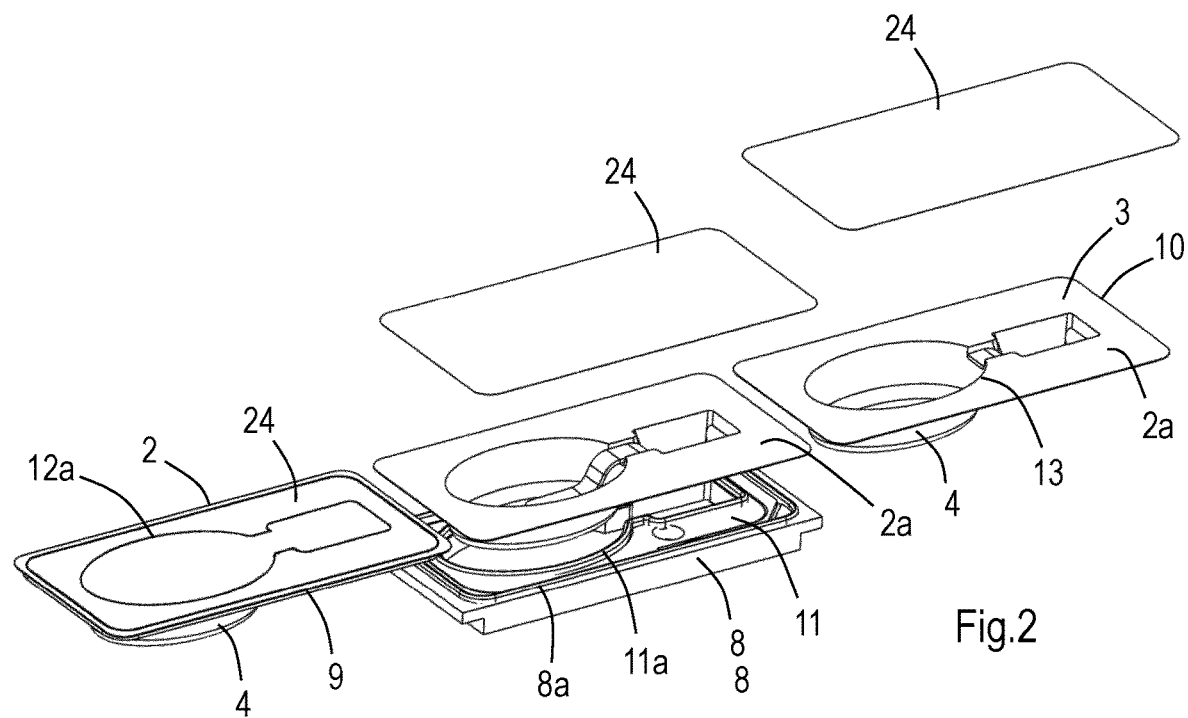

FIG. 2 shows in a simplified manner how moulded product (2a) is provided with a cover sheet using the first and second parts of the lower sealing tool. A moulded product (2a) is shown at the right hand side having the planar surface (3) and a shaped recess (4). The planar surface (3) has a rectangular shaped outer perimeter (10). The shaped recess (4) meets the planar surface (3) at a perimeter (13) of the shaped recess (4). Perimeter (13) will be more irregularly shaped than the rectangular outer perimeter (10) and may change depending on the chosen three dimensional shape of recess (4). In the middle the same moulded product (2a) is shown between a cover sheet (24) and a first part (8) and a second part (11) of the lower sealing tool which will be described in more detail in FIGS. 3 and 4. By sandwiching the moulded product (2a) and the cover sheet (24) between a heated upper plate and the first and second parts (8,11) of the lower sealing tool a sealed package (2) is obtained which is shown at the left hand side of the Figure. Two sealed seams (9, 12a) connect the moulded product (2a) with the cover sheet (24). A first sealed seam (9) at the outer perimeter (10) of the planar surface (3) of the moulded product (2a) and a second sealed seam (12a) on the planar surface (3) of the moulded product (2a) following the perimeter (13) of the shaped recess (4).

Figure 3:
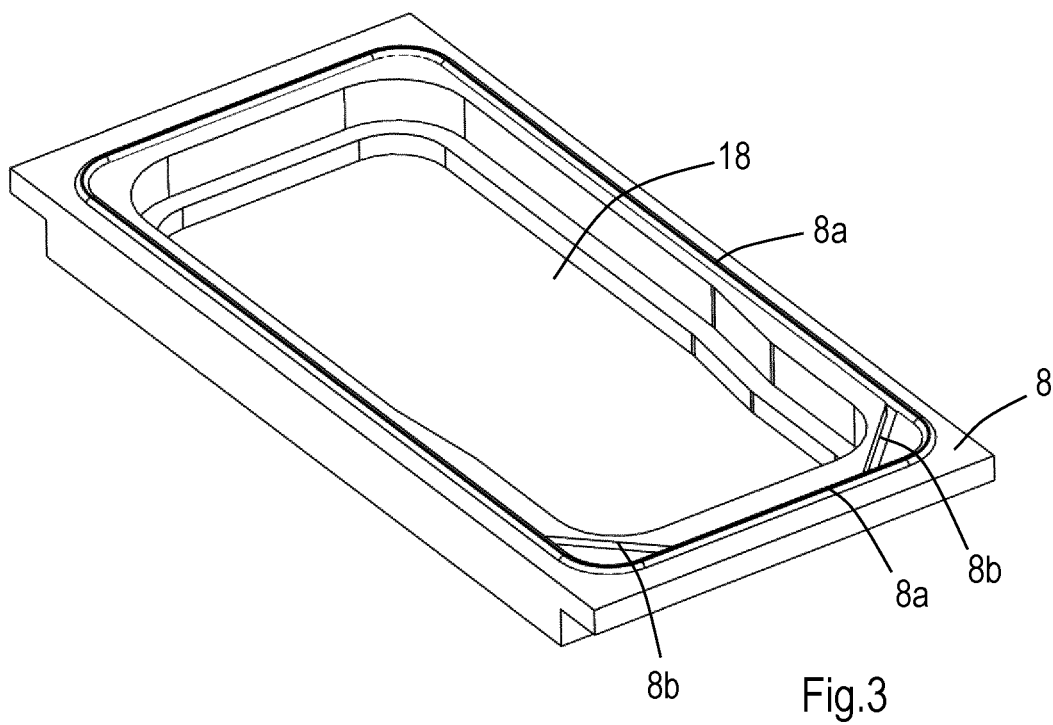
Figure 4:
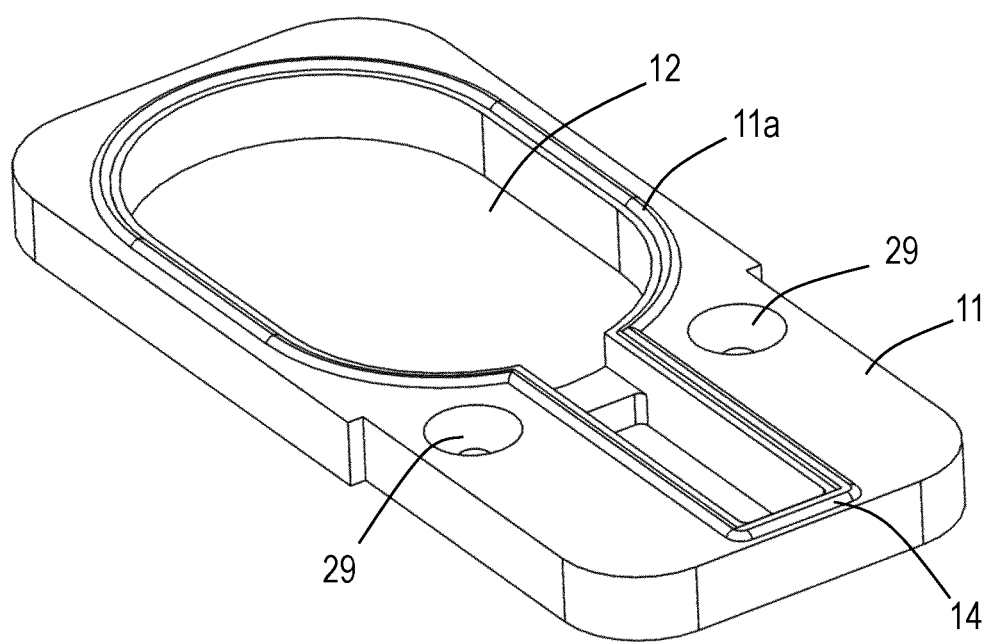

FIG. 3 shows a first part (8) of a lower sealing tool (7) provided with a first seal seam support (8a) and an opening (18) for positioning a second part (11). Such a second part (11) is shown in FIG. 4. The seal seam support (8a) as shown is a gasket as present in a groove. This gasket may alternatively run via groove part (8b) instead of forming a rounded corner (8c) as shown in FIG. 3. This will result in that the sealed package (2) will have two corner flaps wherein the cover sheet is not sealed to the moulded package. This enables a more simple opening of the sealed package when tearing away the cover sheet.

Second part (11) is provided with a second seal seam support (11a) and provided with a seal seam support opening (12). Opening (12) should be such that the shaped recess (4) of the moulded product (2a) fits when the actual sealing takes place and wherein the shaped recess can be easily removed after sealing. Openings (29) are present for bolts (30) when the first and second parts are combined with a lower tooling box (7) as shown in FIGS. 6-7.

Figure 5:
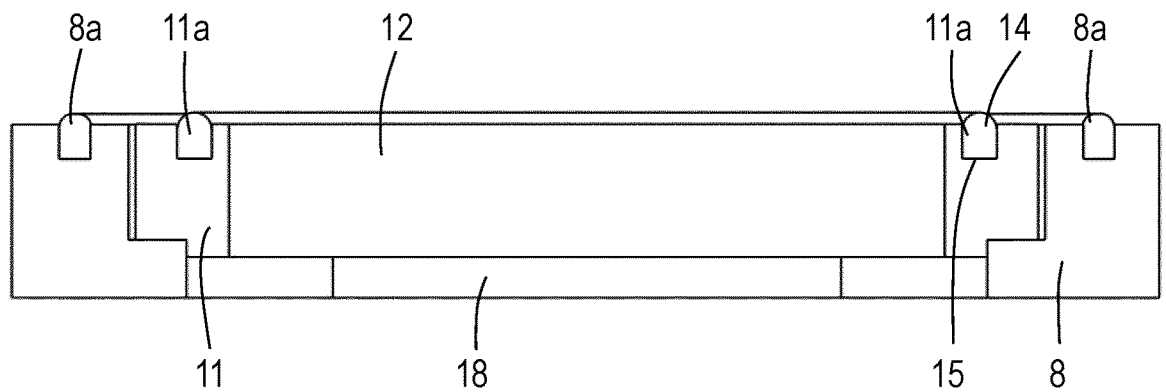

FIG. 5 is a cross-sectional view of combined first and second parts of FIGS. 3 and 4. Here it is shown that a gasket (14) is present in a groove (15) forming the second seal seam support (11a). The first seal seam support (8a) also consists of a gasket as present in a groove.

Figure 6:
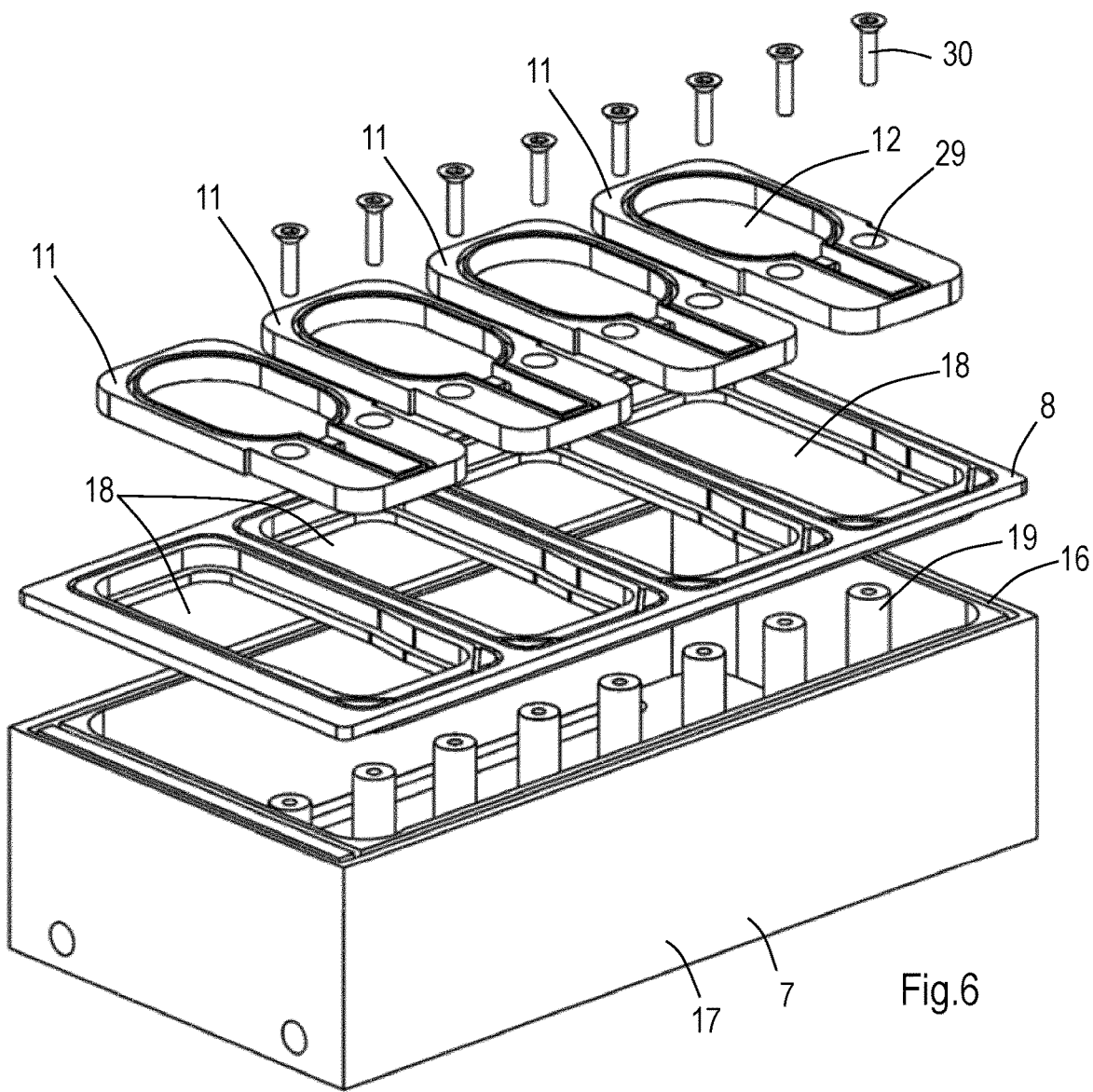

FIG. 6 shows an exploded view of a lower sealing tool (7) provided with a single first part (8). First part (8) supports a first sealed seam (9) at the outer perimeter (10) of the planar surface (3) of four moulded products (2a). 4 first parts (11) are detachably connected to this single first part (8). The first par (8) and the 4 second parts (11) are detachably connected to an upper end (16) of a lower sealing tool box (17).

Figure 7:
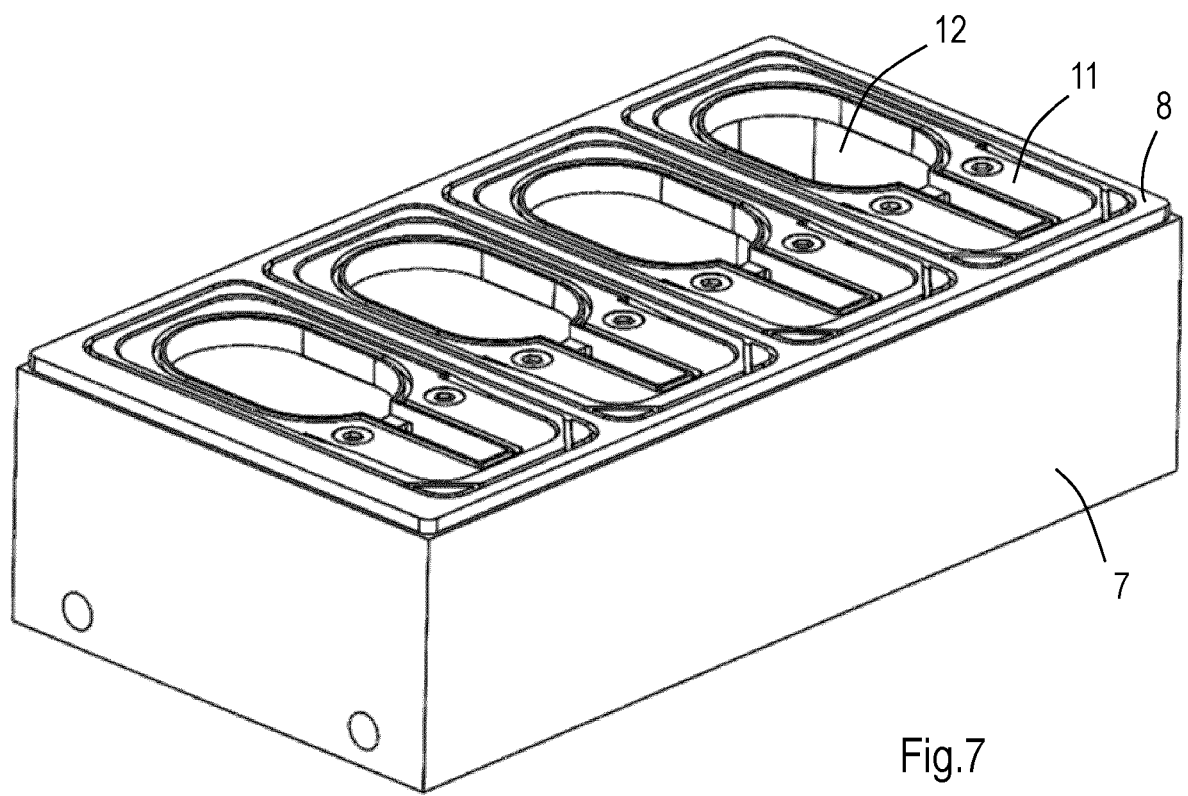

In FIG. 7 the separate elements shown in FIG. 6 are combined. The 4 second parts (11) are placed in first part (8). This combination is placed on top of sealing tool box (17) and bolted together by means of 8 bolts (30) via openings (29) support (19) as present in the lower sealing tool box (17). In this manner the first part (8) and 4 second parts (11) are fixed to the lower sealing tool box (17).

The invention claimed is:

1. A thermoforming packaging machine for producing sealed packages having a planar surface and a shaped recess comprising:
   a forming station with a shaped mould suited to form a moulded product having the planar surface and the shaped recess; and
   a sealing station with a lower sealing tool, the lower sealing tool comprising of a first part provided with a first seal seam support for supporting a first sealed seam at the outer perimeter of the planar surface of the moulded product and a second part provided with a second seal seam support provided with a seal seam support opening to receive the shaped recess of the moulded product and wherein the second seal seam support supports a second sealed seam on the planar surface of the moulded product following the perimeter of the shaped recess; and
   wherein the first part and the second part are separate parts which are detachably connected; and
   wherein the second seal seam support is provided with a gasket as present in a groove in the upper surface of the second part and running along the perimeter of the seal seam support opening.

2. A thermoforming packaging machine according to claim 1, wherein the second part is manufactured by additive manufacturing.

3. A thermoforming packaging machine according to claim 1, wherein the shaped mould of the forming station is manufactured by additive manufacturing.

4. A thermoforming packaging machine according to claim 1, wherein the first part can support a first sealed seam at the outer perimeter of the planar surface of more than one moulded product and wherein more than one parts are detachably connected to the first part.

5. A thermoforming packaging machine according to claim 4, wherein the first part is provided with more than one openings for positioning the more than one second parts and wherein the combined first and second parts are bolted to a support as present in the lower sealing tool box thereby fixing the first and second parts to the lower sealing tool box.

6. A thermoforming packaging machine for producing sealed packages having a planar surface and a shaped recess comprising:
   a forming station with a shaped mould suited to form a moulded product having the planar surface and the shaped recess; and
   a sealing station with a lower sealing tool, the lower sealing tool comprising of a first part provided with a first seal seam support for supporting a first sealed seam at the outer perimeter of the planar surface of the moulded product and a second part provided with a second seal seam support provided with a seal seam support opening to receive the shaped recess of the moulded product and wherein the second seal seam support supports a second sealed seam on the planar surface of the moulded product following the perimeter of the shaped recess; and
   wherein the first part and the second part are separate parts which are detachably connected; and
   wherein the first part and the second part are detachably connected to an upper end of a lower sealing tool box.

7. A thermoforming packaging machine according to claim 6, wherein the first part can support a first sealed seam at the outer perimeter of the planar surface of more than one moulded product and wherein more than one parts are detachably connected to the first part.

8. A thermoforming packaging machine according to claim 7, wherein the first part is provided with more than one openings for positioning the more than one second parts and wherein the combined first and second parts are bolted to a support as present in the lower sealing tool box thereby fixing the first and second parts to the lower sealing tool box.

9. A thermoforming packaging machine according to claim 6, wherein the second part is manufactured by additive manufacturing.

10. A thermoforming packaging machine according to claim 6, wherein the shaped mould of the forming station is manufactured by additive manufacturing.

* * * * *